(12) United States Patent
Marco Serrano et al.

(10) Patent No.: US 9,365,355 B2
(45) Date of Patent: Jun. 14, 2016

(54) MOULD CONVEYOR

(71) Applicant: LORAMENDI, S. COOP, Vitoria-Gasteiz (Álava) (ES)

(72) Inventors: César Marco Serrano, Vitoria-Gasteiz (ES); Francisco Javier Calvo Poza, Vitoria-Gasteiz (ES)

(73) Assignee: LORAMENDI, S. COOP (ES)

( * ) Notice: Subject to any disclaimer, the term of this patent is extended or adjusted under 35 U.S.C. 154(b) by 0 days.

(21) Appl. No.: 14/404,716

(22) PCT Filed: May 23, 2013

(86) PCT No.: PCT/ES2013/070326
§ 371 (c)(1),
(2) Date: Dec. 1, 2014

(87) PCT Pub. No.: WO2013/178849
PCT Pub. Date: Dec. 5, 2013

(65) Prior Publication Data
US 2015/0107962 A1    Apr. 23, 2015

(30) Foreign Application Priority Data

May 29, 2012 (ES) .................................. 201230812
Sep. 19, 2012 (ES) .................................. 201231454

(51) Int. Cl.
B65G 37/00 (2006.01)
B65G 25/04 (2006.01)
B22D 33/00 (2006.01)

(52) U.S. Cl.
CPC ................ B65G 25/04 (2013.01); B22D 33/00 (2013.01); B65G 37/00 (2013.01)

(58) Field of Classification Search
CPC .................... B65G 25/04–25/12; B22D 33/00; B22D 33/005

USPC ............................................... 198/570, 621.1
See application file for complete search history.

(56) References Cited

U.S. PATENT DOCUMENTS 3,768,632 A * 10/1973 Taniguchi .............. B65G 25/02
                                                          198/621.1
3,841,468 A * 10/1974 Eggert .................... B07C 5/122
                                                          198/621.1

(Continued)

FOREIGN PATENT DOCUMENTS

EP        0092337 A1    10/1983
ES        383042 A      11/1972

(Continued)

OTHER PUBLICATIONS

International Search Report for corresponding application PCT/ES2013/070326 filed May 23, 2013; Mail date Oct. 9, 2013.

Primary Examiner — William R Harp
(74) Attorney, Agent, or Firm — Cantor Colburn LLP

(57) ABSTRACT

The invention relates to a conveyor including a frame having a supporting grille mounted therein, and a clamping mechanism which can move longitudinally with respect to the supporting grille and which includes longitudinal clamps where the clamps have a pair of delivery clamps; the push device is a push carriage connected to the actuation means by means of a linear push system including at least one linear push element having a driving element connected to the actuation means and arranged in an area upstream of the inlet area of the mold conveyor and a longitudinal push bar extending linearly below the supporting grille; and the push carriage is guided horizontally to perform a horizontal forward and backward movement.

18 Claims, 17 Drawing Sheets

(56) References Cited

U.S. PATENT DOCUMENTS

| | | | | |
|---|---|---|---|---|
| 4,323,151 A | * | 4/1982 | Andrews | B65G 25/02 198/740 |
| 4,540,036 A | * | 9/1985 | Jensen | B22D 33/005 164/323 |
| 4,825,770 A | * | 5/1989 | Naruse | B65G 25/04 104/162 |
| 7,032,641 B2 | * | 4/2006 | Jacobsen | B22D 33/005 164/130 |

FOREIGN PATENT DOCUMENTS

| ES | 8405650 A1 | 1/1984 |
|---|---|---|
| WO | 03097275 A1 | 11/2003 |

* cited by examiner

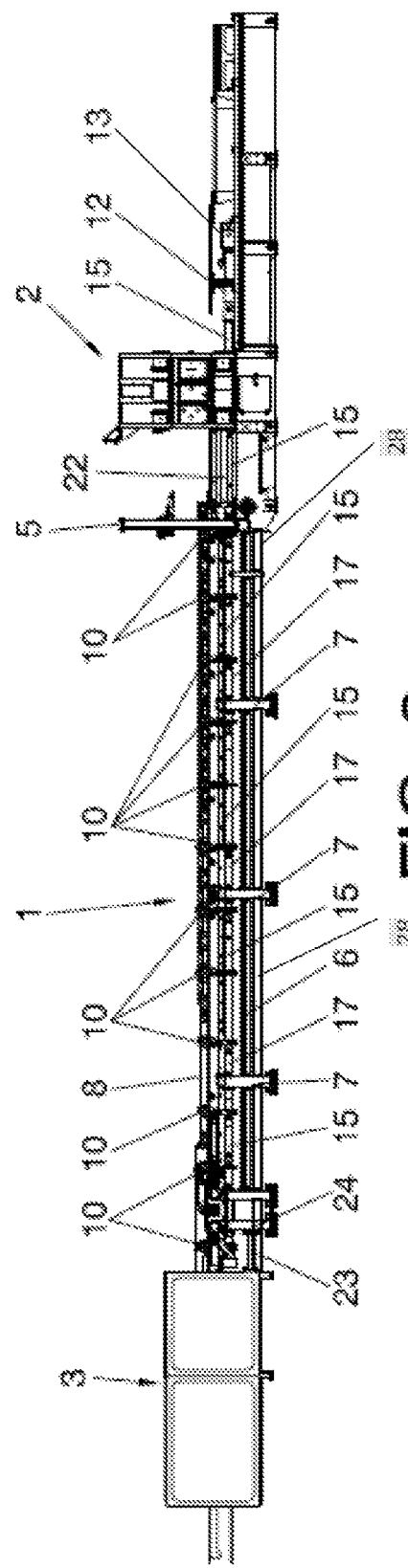
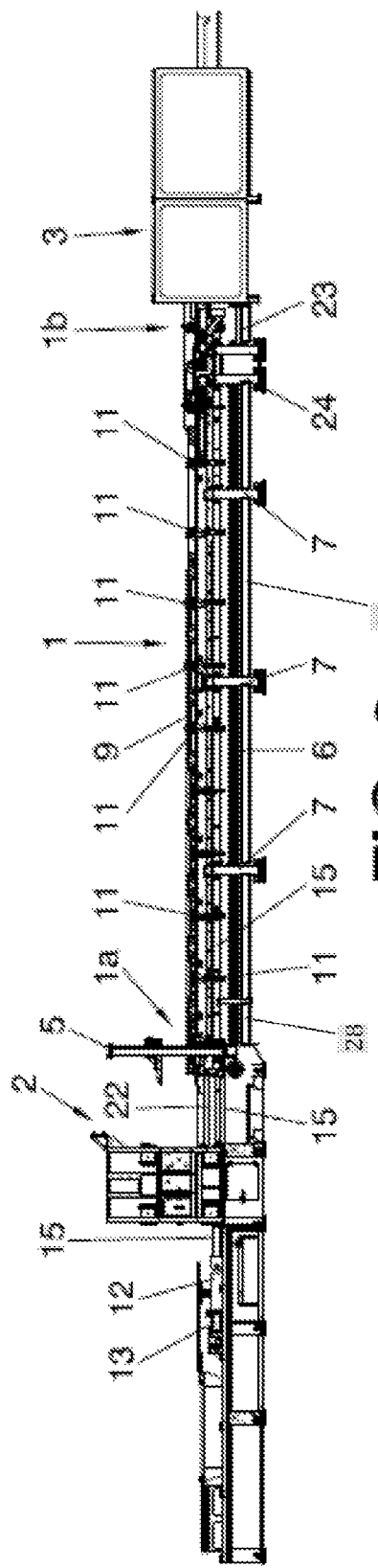
FIG. 2
FIG. 3

*(A-A)*

MOULD CONVEYOR

TECHNICAL FIELD OF THE INVENTION

The present invention is comprised in the technical field of installations for smelting metal parts by casting in sand blocks, and more particularly in the field of mold or sand block conveyors conveying sand blocks coming from the molding machine.

BACKGROUND OF THE INVENTION

An installation for smelting metal parts by casting in sand blocks generally comprises a vertical blow molding machine in which the blocks are obtained and a casting installation in which it pours the molten metal in the blocks. Once the molten metal has cooled and the molded part has solidified, said part is released from the mold by means of breaking the sand mold which falls apart. The blocks produced in the molding machine move forward to the casting station and then to the mold release area by means of a series of conveyors.

At the outlet of the molding machine there is arranged a mold or block conveyor, such as an automatic mold conveyor ("AMC") or a precision mold conveyor ("PMC") for example, conveying the blocks to the next work station, such as a synchronized belt conveyor ("SBC") for example. The mold or block conveyor must be synchronized with the exit of the blocks formed in the molding machine so that the blocks are arranged in a precise row and so that they can furthermore be delivered to the next work station.

A conventional mold or block conveyor comprises a block inlet and a block outlet and a supporting grille mounted in a frame and in which there is supported a plurality of blocks in positions that are moved forward successively, as well as a clamping mechanism which can move longitudinally with respect to the supporting grille. The clamping mechanism comprises respective longitudinal clamps arranged on opposite sides along the supporting grille. Each of the clamps is also transversely movable by a plurality of actuators moving the clamps transversely between a clamping position in which they can hold the blocks against one another, and a release position in which they are not in contact with the blocks. A reciprocating mechanism is connected to the clamping mechanism to move the clamps forward when they are in their clamping position and to move the clamps backward when they are in their release position.

In conventional mold or block conveyors, the reciprocating mechanism is hydraulic and comprises a hydraulic cylinder acting on a transverse rocker arm rocking on a fixed support. The rocker arm is connected to respective connecting rods which are in turn connected to the respective clamping mechanisms. The retraction/extension movement of the hydraulic cylinder generates movements that are transmitted to the clamping mechanism in the form of reciprocating linear movements. The reciprocating mechanism is usually arranged at the outlet of the block conveyor to reduce the risk of damage to the blocks (filled with molten metal) and to avoid synchronization problems that can lead to the columns of blocks that are pushed out of the molding machine opening up.

Although conventional conveyors provide reasonable conveyance synchronization, they have drawbacks relating to the actuation and maintenance of the hydraulic cylinder and due to the fact that the rocker arm is a transverse element exposed to sand falling onto out of the blocks and preventing the arrangement of sand cleaning elements, such as a sand extraction band for example, extending below the entire conveyor for the automatic cleaning of the low area of the conveyor.

BRIEF SUMMARY

The terms mold conveyors and block conveyors are used indistinctly throughout the description and the claims to refer to objects that are similar for the purposes of the patent, so one term, the other term, or both terms, will be used indistinctly.

The invention overcomes the drawbacks of the state of the art described above by means of a mold or block conveyor with a block inlet area and a block outlet area, comprising a frame having mounted therein a supporting grille for supporting a plurality of molds in positions that are moved forward successively, a clamping mechanism which can move longitudinally with respect to the supporting grille and which comprises respective longitudinal clamps arranged on opposite sides along the supporting grille, at least one of the clamps being transversely movable by a plurality of actuators between a clamping position in which the clamps can hold the blocks against one another and a release position in which the clamps do not hold the molds, a reciprocating mechanism for moving the clamping mechanism forward when the clamps are in their clamping position and for moving the clamping mechanisms backward when the clamps are in their release position, characterized in that the clamps comprise a pair of delivery clamps arranged in the outlet area of the mold conveyor;

the reciprocating mechanism comprises a push device arranged in the outlet area of the mold conveyor, the push device comprising respective lug elements articulated to the delivery clamps by means of respective connecting rods for pulling on the clamp and the push device being connected to actuation means providing reciprocating movement to the push device;

the push device is a push carriage connected to the actuation means by means of a linear push system comprising at least one linear push element comprising a driving element connected to the actuation means and arranged in an area upstream of the inlet area of the mold conveyor, and a longitudinal push bar connecting the driving element to the push carriage and extending linearly below the supporting grille;

the push carriage is guided horizontally in a supporting structure to perform a horizontal forward and backward movement.

The mold conveyor according to the present invention can be equipped with a conveyor device, comprising a waste conveyor belt driven by an electric motor, for example, and arranged below the supporting grille, preferably along the entire block conveyor, including its inlet and outlet areas. The conveyor belt can be guided on transverse rollers the ends of which are rotatably mounted in an axial frame. The axial frame can be mounted on supporting legs. This waste conveyor belt is intended for collecting sand from the blocks falling on the supporting grille while conveying the blocks. The waste conveyor belt is preferably arranged at least below the push carriage.

The linear push system preferably comprises a single linear push element acting on a transverse part of the push carriage. This transverse part of the push carriage can be a front crosspiece provided with a rear transverse slot in which the push bar is coupled.

The driving element can be mounted in a structure of a molding machine delivering the blocks to the block conveyor, and it can comprise a longitudinal spindle connected to the push bar and actuated by an electric motor, or a longitudinal rack bar connected to the push bar and a pinion meshing in the rack actuated by an electric motor.

When it is stated that the driving element or the actuation means are located in the structure of the molding machine, it must be understood to mean that it is in an area attached to said molding machine or included as part of the molding machine, for which purpose since this molding machine is protected against the entrance of molding sand waste or dirt, these actuation means will be protected against premature deterioration as they are in an enclosed area where the entry of dirt is controlled, prolonging installation maintenance periods and the machine maintenance cost.

In a preferred embodiment of the invention, the push carriage comprises respective side arms attached by at least one rear crosspiece and one front crosspiece located below the supporting grille. Each of the side arms has a longitudinal outer guiding rib guided in a longitudinal guidance passage located in the supporting structure. According to this preferred embodiment, the supporting structure can comprise respective upper side plates mounted in respective pairs of side supports, and in each side plate there are mounted upper and lower wheels which together define the longitudinal guidance passage in which the respective guiding rib of the push carriage is guided. Each side plate can have a window in which there is mounted a horizontal roller with the capacity to rotate about a vertical axis of rotation contacting an outer surface of the respective outer guiding rib, thus providing lateral guidance of the push carriage.

According to this preferred embodiment, the pairs of side supports can be attached by a bridge on which the supporting grille is supported. The bridge can be comprised by a rear crosspiece and a front crosspiece which are optionally attached by respective inner side members. In this case, the push bar extends through the rear crosspiece and the front crosspiece.

The push bar is preferably guided longitudinally in guiding elements mounted in the frame. At least some of the guiding elements can be hollow bodies with respective axial cavities through which the push bar passes.

To protect the push bar and, where appropriate, the guiding elements from sand and metal falling from the supporting grille, a longitudinal protective sheet arranged above the push bar and the guiding elements can be envisaged.

The push carriage can further comprise respective thick side plates connected to the clamps, and the thick side plates of the push carriage can be attached to one another by a crosspiece connected to each linear push element and comprise respective upper parts, each upper part being connected to one of the clamps through an inner upper connecting rod, and the inner upper connecting rod comprising a first end part articulated to said upper part and a second end part articulated to the clamp.

BRIEF DESCRIPTION OF THE DRAWINGS

Aspects and embodiments of the invention are described below based on the attached drawings, in which

FIG. 2 is a side elevational view of the installation with the block conveyor shown in FIG. 1;

FIG. 3 is a side elevational view of the other side of the installation shown in FIG. 2;

DETAILED DESCRIPTION

Figure 1:
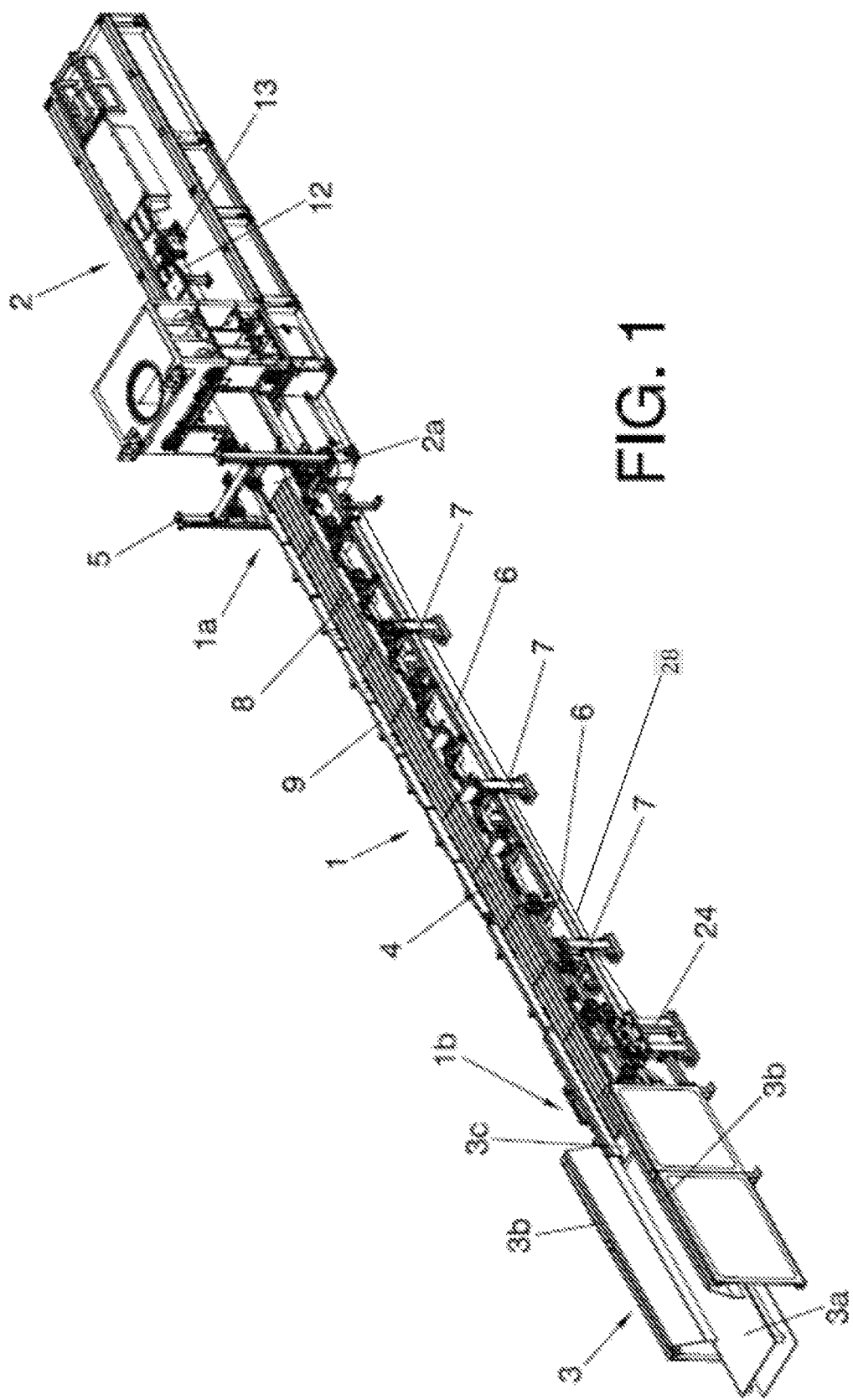
FIG. 1 is a perspective view of an embodiment of a molding installation comprising a block conveyor according to an embodiment of the present invention.
Figure 4:
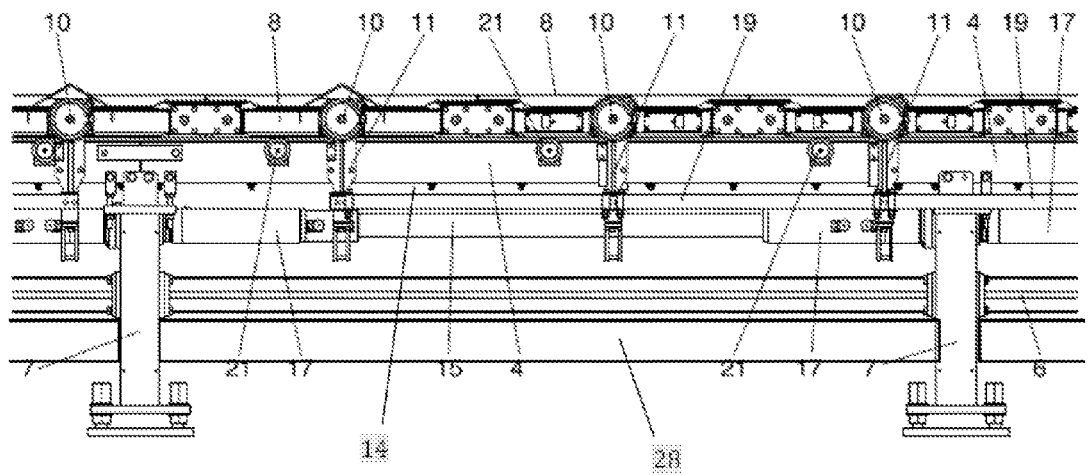
FIG. 4 is a partial side elevational view of the side of the block conveyor shown in FIG. 2.
Figure 5:
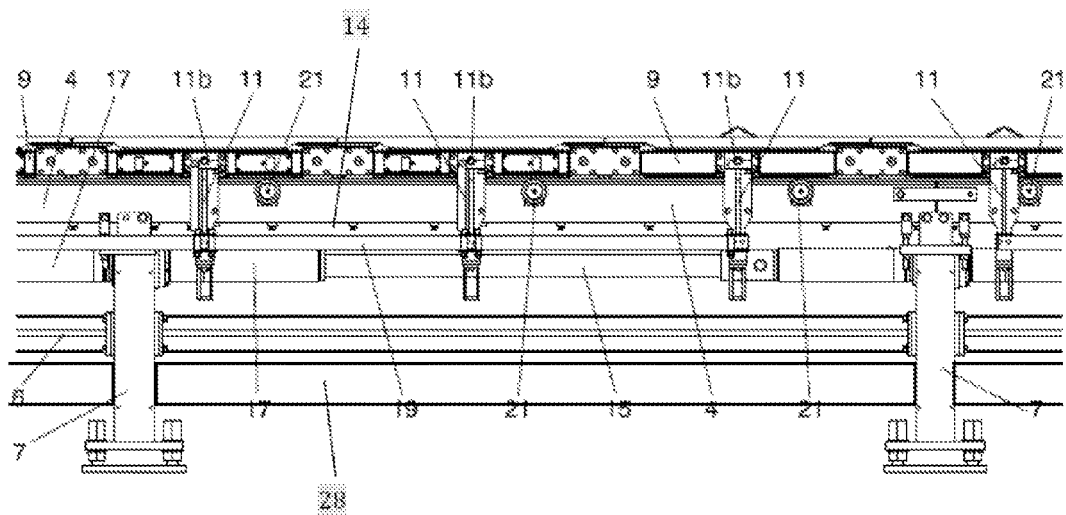
FIG. 5 is a partial side elevational view of the side of the block conveyor shown in FIG. 3.
Figure 6:
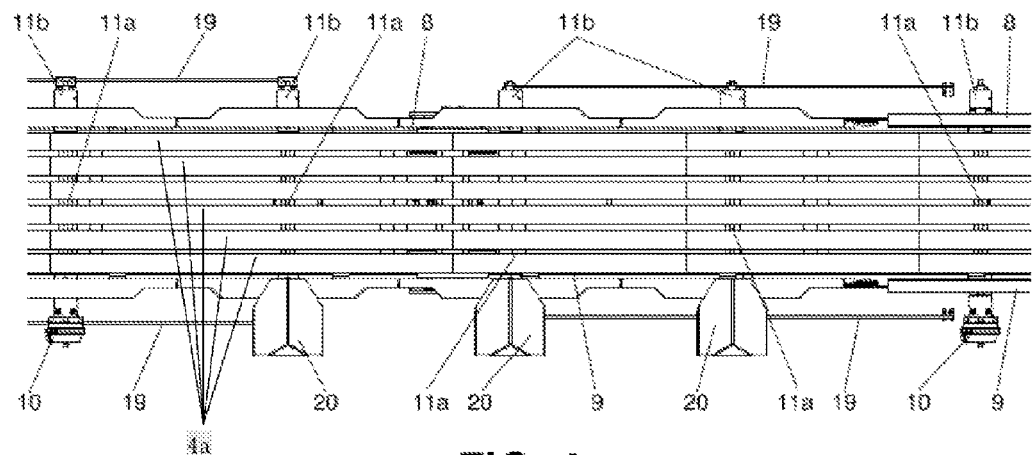
FIG. 6 is a partial top plan view of the block conveyor shown in FIG. 1.
Figure 7:
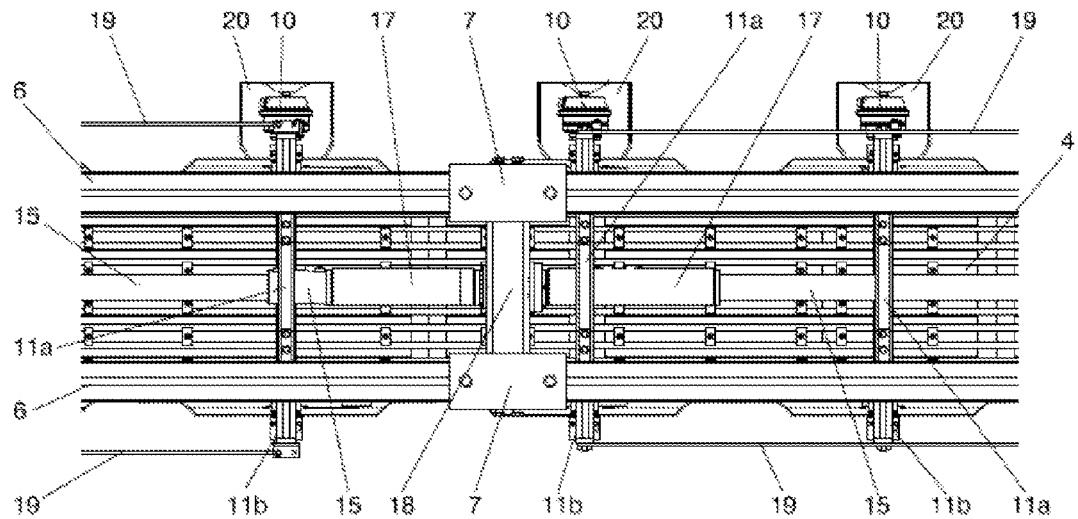
FIG. 7 is a bottom partial plan view of the block conveyor shown in FIG. 1.
Figure 8:
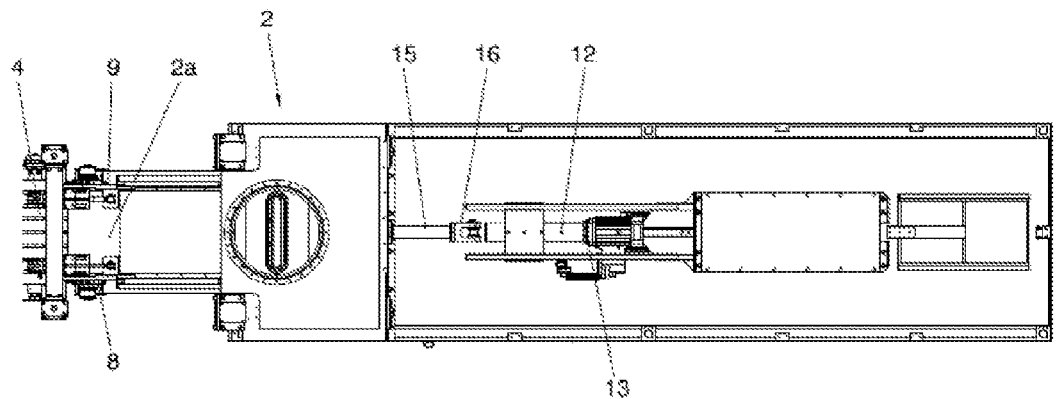
FIG. 8 is a top plan view of the structure of the molding machine shown in FIG. 1.

According to the embodiment shown in the drawings, the block conveyor -1- of the present invention comprises an inlet area -1a- where blocks (not shown in the drawings) received from a molding machine enter, said molding machine comprising a structure -2-, and an outlet area -1b- from where the blocks are delivered to the next station, for example to a conventional synchronized belt conveyor -3- comprising a conveyor belt -3a- and protective thick side plates -3b- extending along the conveyor belt -3a-. Between the structure -2- and the block conveyor -1- there is arranged a gantry -5- holding the upper parts of successive blocks as they exit the molding machine. The block conveyor -1- is attached to the structure of the molding machine -2- by means of first tie rods -22- and to the synchronized belt conveyor -3- by means of second tie rods -23-. Between the structure of the molding machine -2- and the supporting grille -4- there is arranged a first horizontal thick plate -2a-, whereas between the supporting grille -4- of the block conveyor -1- and the conveyor belt -3a- of the synchronized belt conveyor -3- there is arranged a second horizontal thick plate -3c-. The synchronized belt conveyor -3- rests on supporting legs -3d-.

Figure 9:
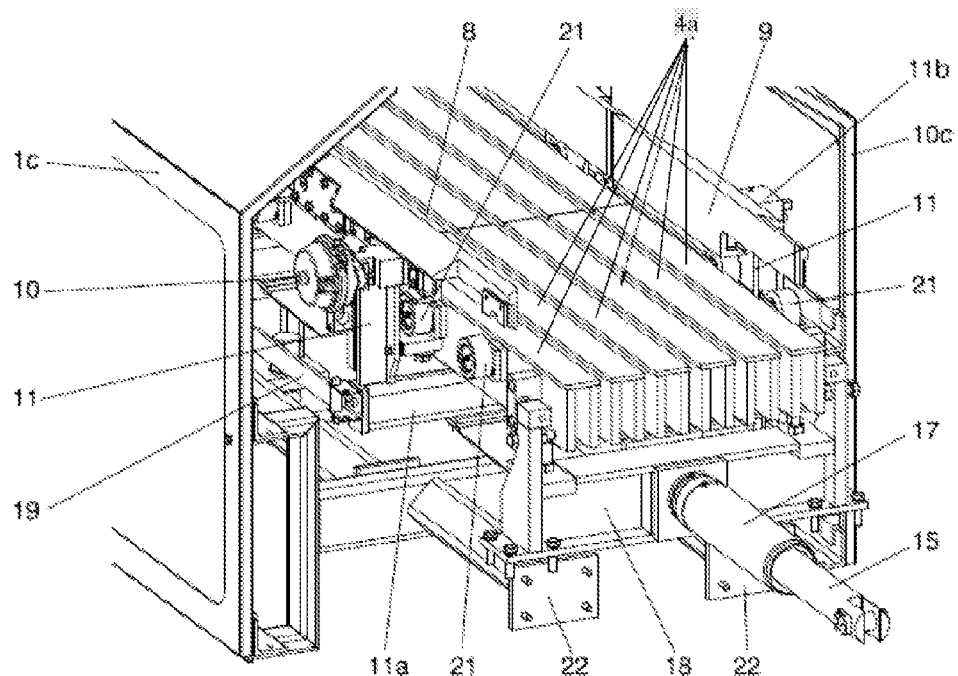
FIG. 9 is a perspective view of the inlet area of the block conveyor shown in FIG. 1.
Figure 10:
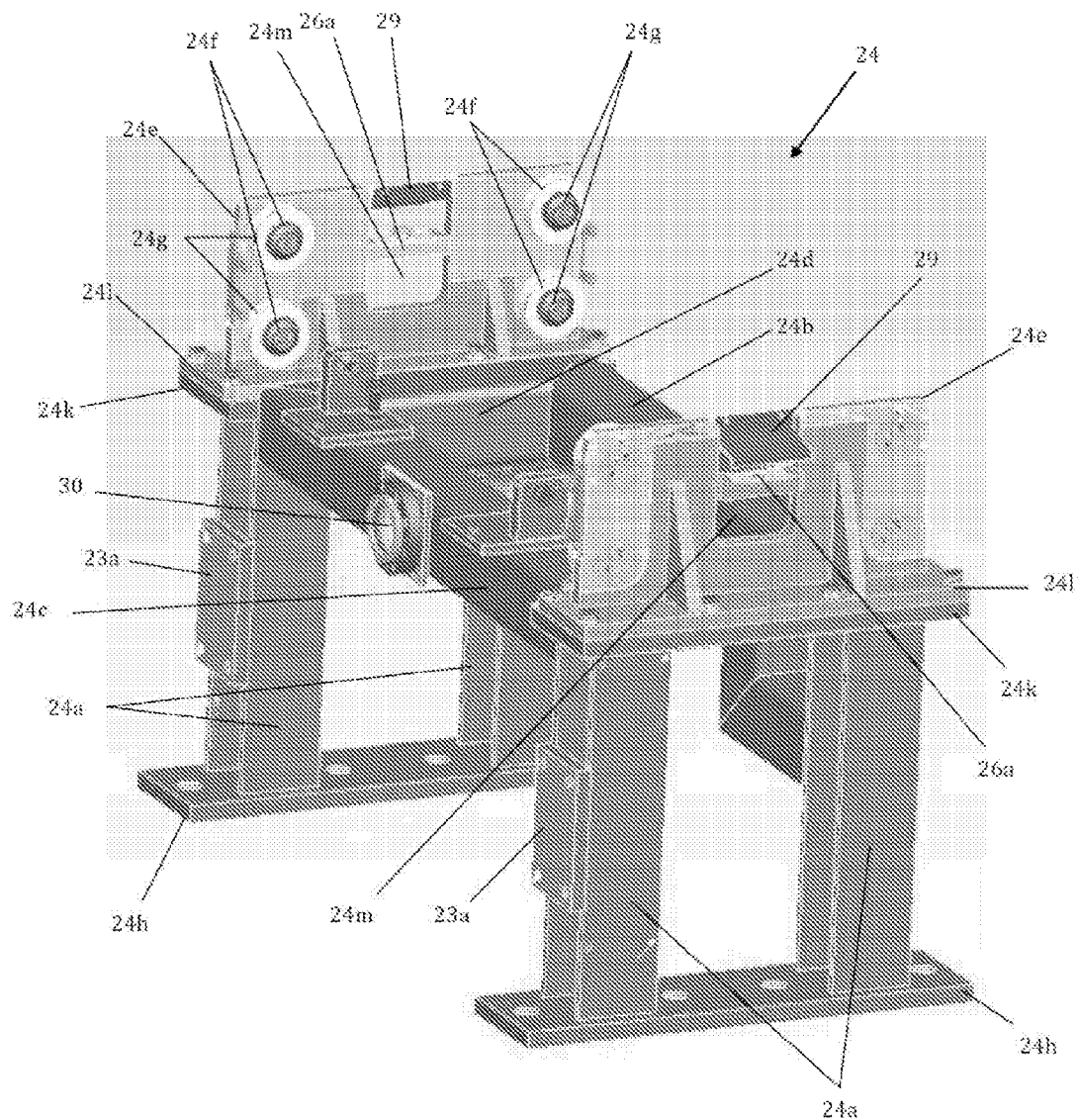
FIG. 10 is a front-side perspective view of the supporting structure located in the outlet area of the block conveyor for conveying blocks to the synchronized belt conveyor, according to FIG. 1.
Figure 11:
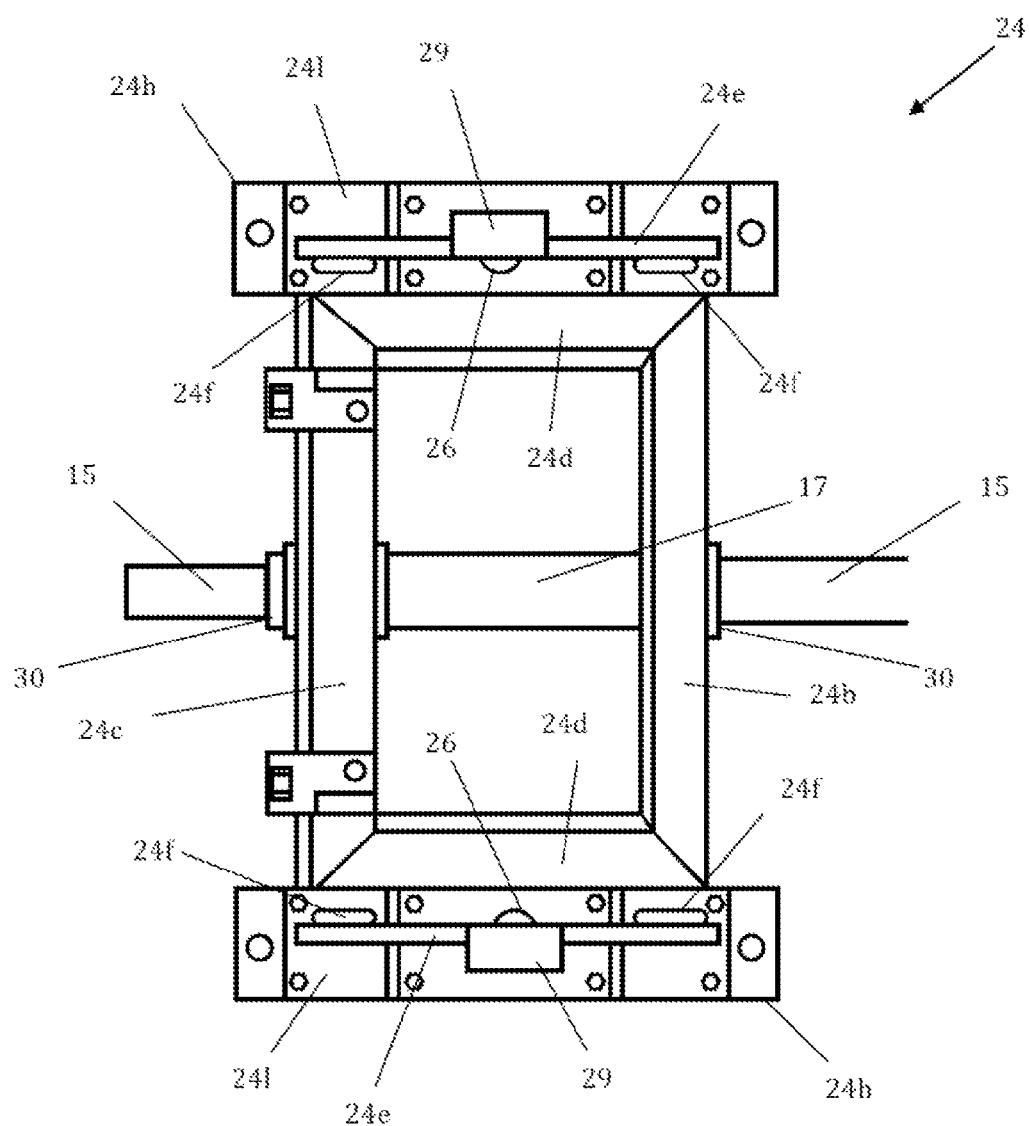
FIG. 11 is a top plan view of the supporting structure shown in FIG. 10.
Figure 12:
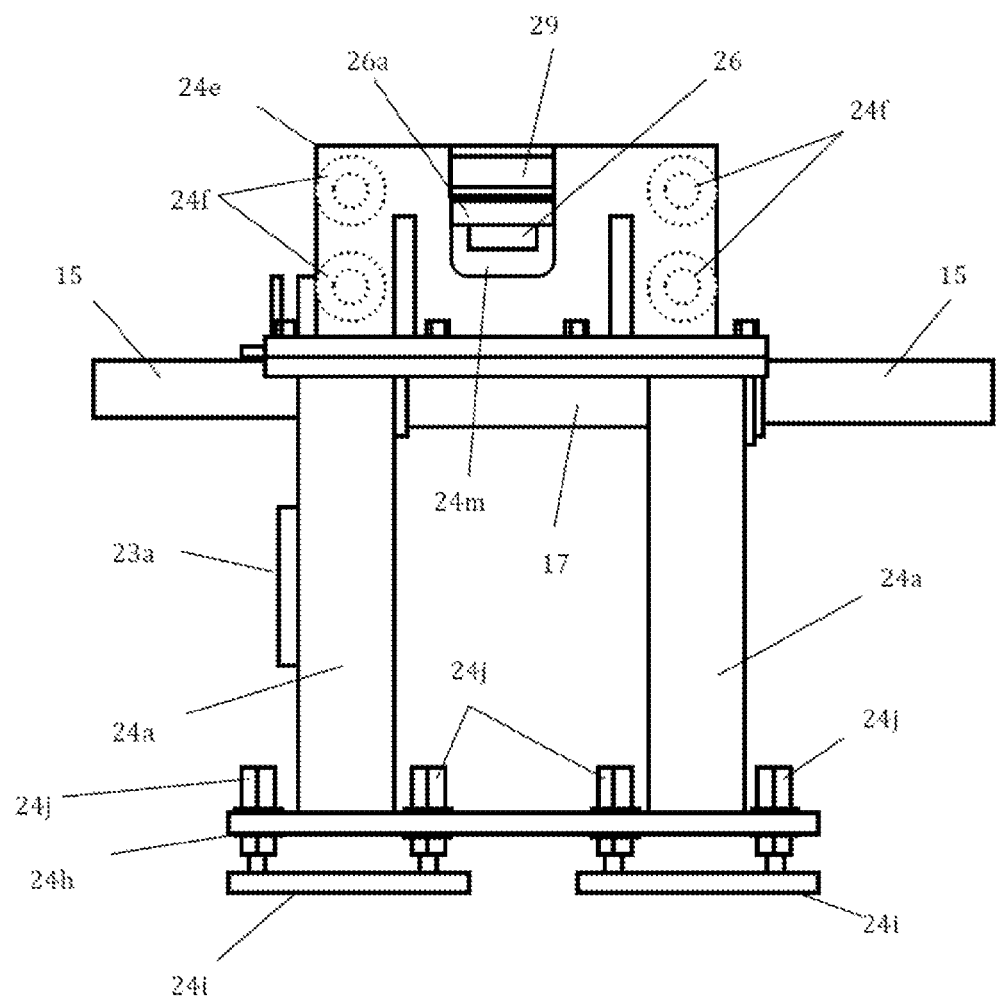
FIG. 12 is a side elevational view of the supporting structure shown in FIG. 10.
Figure 13:
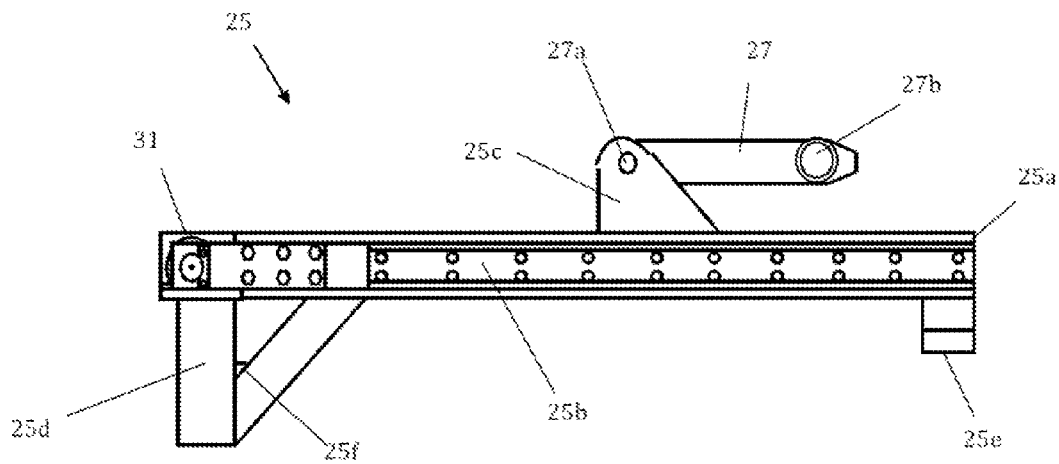
FIG. 13 is a side elevational view of the carriage for pulling on the clamps located in the outlet area of the block conveyor shown in FIG. 1.
Figure 14:
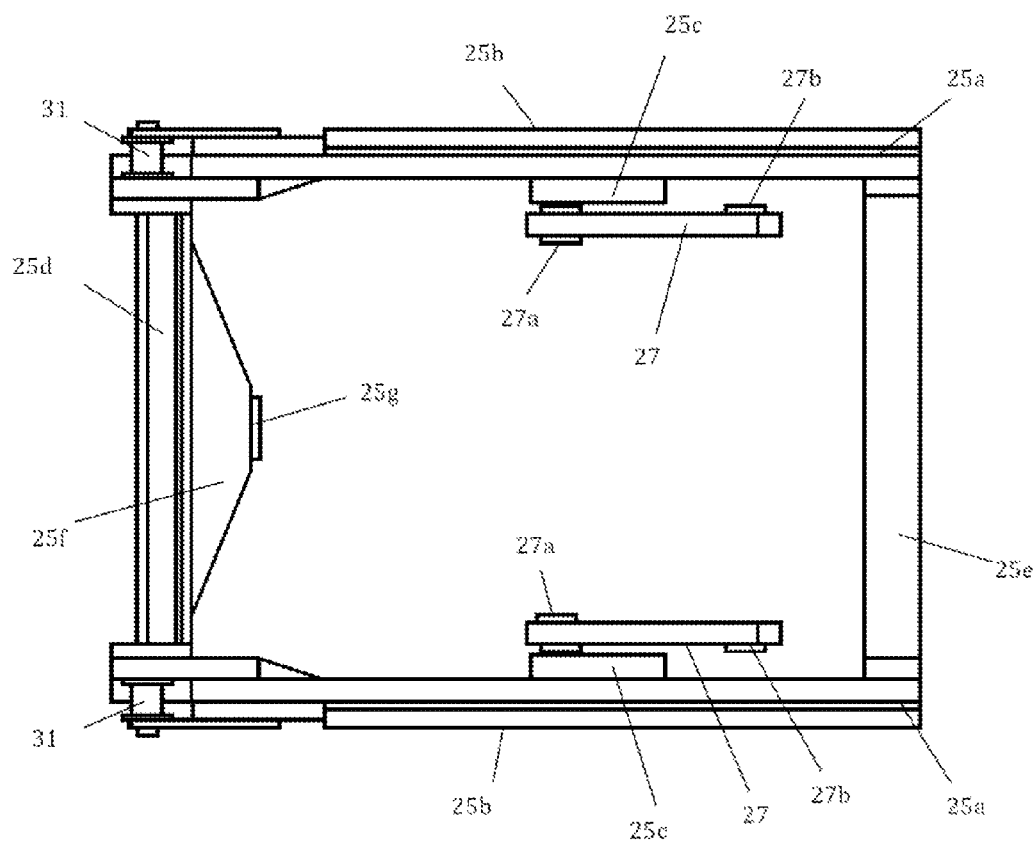
FIG. 14 is a top plan view of the carriage for pulling on the clamps shown in FIG. 13.
Figure 15:
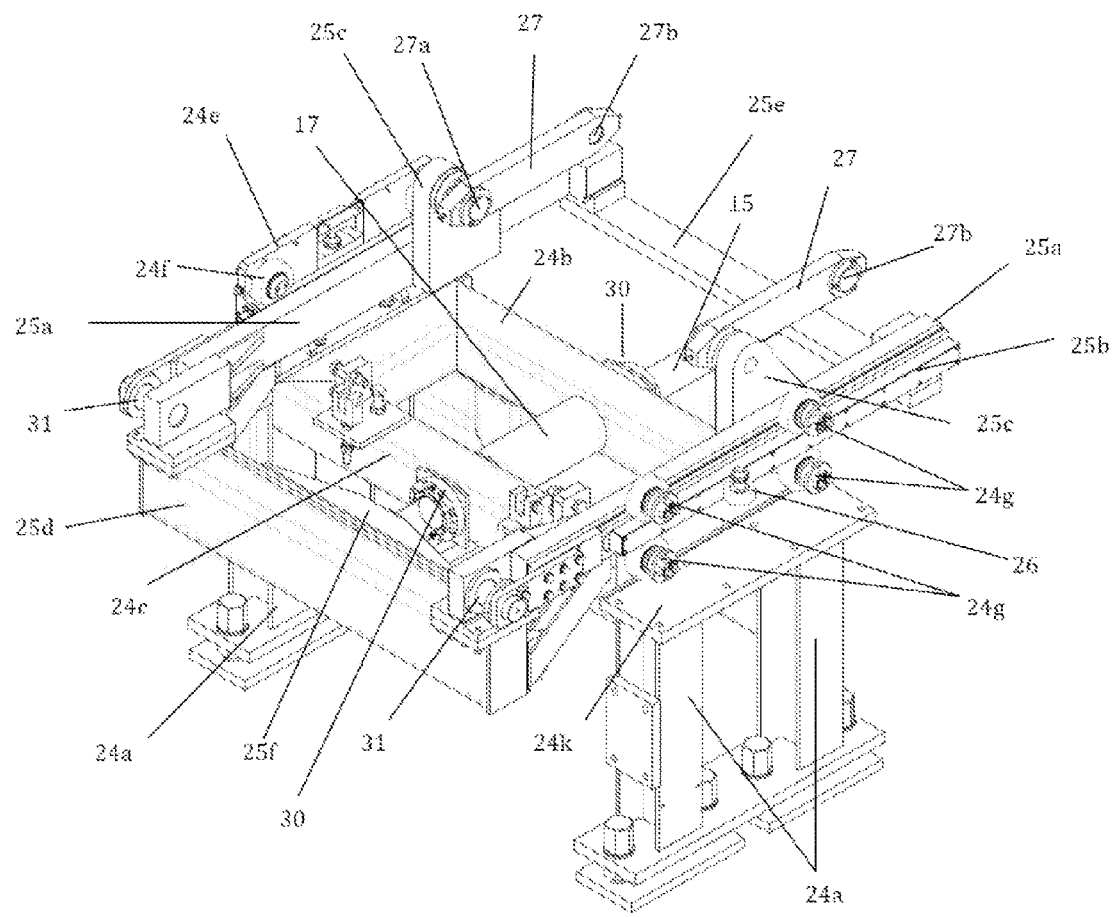
FIG. 15 is a front-side perspective view of the carriage for driving clamps shown in FIGS. 13 and 14 mounted in the supporting structure shown in FIGS. 10-12.
Figure 16:
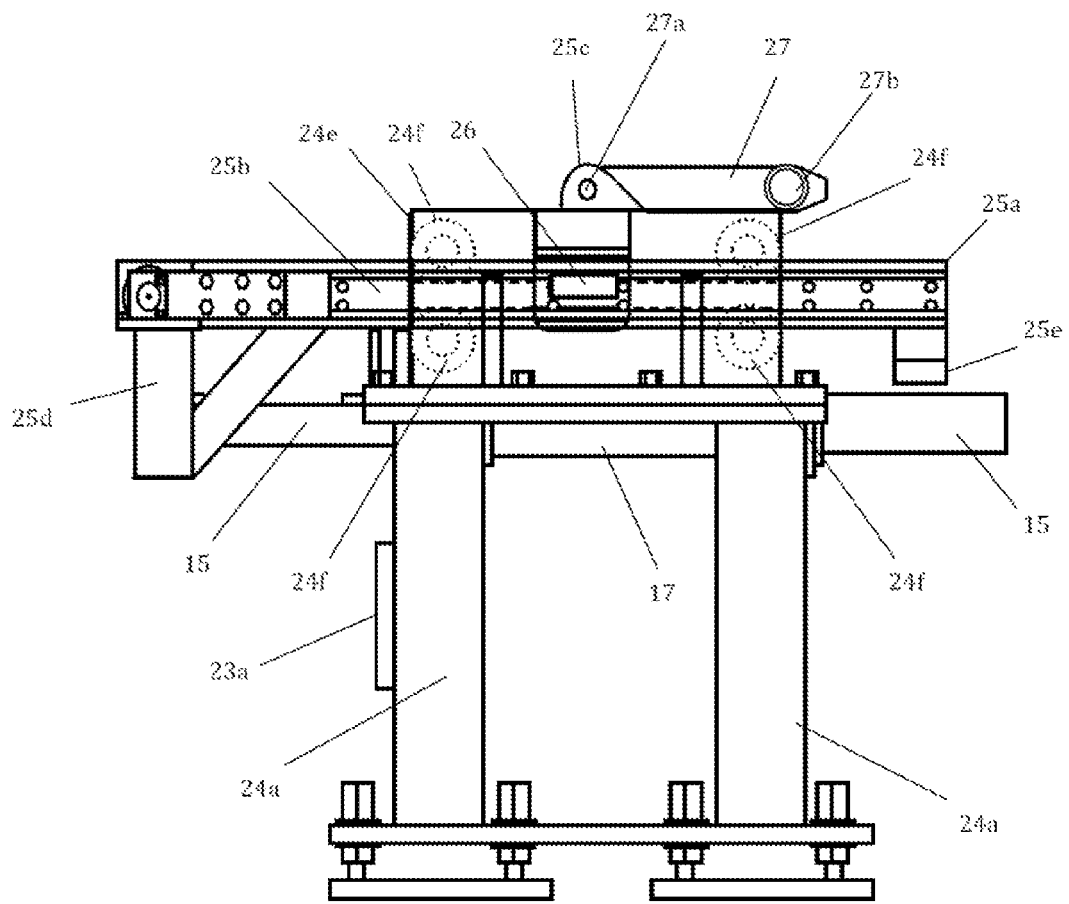
FIG. 16 is a side view of the assembly formed by the carriages for driving clamps and the supporting structure shown in FIG. 15.

The supporting grille -4- comprises a plurality of longitudinal grille bars -4a- firmly mounted in a frame comprising lateral lower side members -6- mounted between respective side supporting columns -7-. At the front ends of the longitudinal grille bars -4a- there is mounted a front transverse sheet -4b-. Along the supporting grille -4- and on opposite sides thereof there transversely extend respective movable clamps -8, 9- forming part of a clamping mechanism which can move longitudinally with respect to the supporting grille -4-. The clamps -8, 9- are made up of respective pluralities of vertical clamping plates that are longitudinally aligned and connected to one another. The clamps comprise respective delivery clamps -8a, 9a- intended for delivering successive blocks to the synchronized belt conveyor -3-. The sides of the block conveyor -1- are protected by a conventional outer fairing -1c- which is only shown in FIG. 9 for the sake of clarity of the drawings.

The clamping mechanism comprises a plurality of actuators -10- which can be pneumatic, hydraulic, mechanical or electromechanical actuators, for example, transversely moving one clamp -8- out of clamps -8, 9- between a clamping position in which the clamps -8, 9- hold the blocks against one another and a release position in which the clamps -8, 9- do not hold the blocks. Each actuator -10- is mounted at the upper end of one of the vertical branches of a U-shaped frame -11- comprising two vertical branches attached in the lower portion by a lower horizontal branch -11a-. The free upper end -11b- of the other vertical branch is attached to clamp -9- opposite clamp -8- to which the actuator -10- is coupled. The actuators -10- are protected in the upper portion by transverse protective sheets -20-.

The block conveyor -1- comprises a reciprocating mechanism for moving the clamping mechanism forward when the clamps -8, 9- are in their clamping position and to move the clamping mechanisms backward when the clamps -8, 9- are in their release position. To that end, the clamps -8, 9- are supported on transverse rollers -21- laterally projecting from the supporting grille -4-. In the embodiment shown in the drawings, the reciprocating mechanism comprises a linear push system comprising a longitudinal spindle -12- driven by an electric motor -13- as well as a push carriage -25- longitudinally connected to the linear push system below the supporting grille -4- and mounted in the outlet area -1b- of the block conveyor -1-.

The longitudinal spindle -12- is arranged at the head of the structure of the molding machine -2-, i.e., in an area upstream of the inlet area -1a- of the block conveyor -1-, and connected to the push carriage -25- by means of a longitudinal push bar -15- which can have reciprocating movement and is mounted in the frame in a plane below the supporting grille. The push bar -15- is made up of a plurality of longitudinal sections connected to one another, and it is in turn connected at one of its ends to the spindle -12- by means of a coupling -16-. Furthermore, the push bar -15- is guided longitudinally in axial cavities of guiding elements -17- mounted in supporting crosspieces -18- mounted between the side supporting columns -7-. The U-shaped frames -11- are attached by side longitudinal stabilizer bars -19-. The push bar -15- passes through the free space between the vertical branches and the upper end -11b- of the U-shaped frames -11-.

Below the supporting grille -4-, and particularly below the push bar -15-, there is arranged a conveyor device -28- comprising a waste conveyor belt -28a- driven by an electric motor (not shown in the drawings) and guided on transverse rollers -28b- the ends of which are rotatably mounted in an axial frame -28c- which is in turn mounted on supporting legs -28d-. The waste conveyor belt -28a- collects sand from the blocks falling between the grille bars -4a- while conveying the blocks. A longitudinal protective sheet -14- is envisaged to protect the push bar -15- and the guiding elements -17- from falling sand and liquid metal.

The block conveyor -1- further comprises a supporting structure -24- attached to the lower side members -6- of the frame in the outlet area -1a- of the block conveyor -1-. This supporting structure -24- comprises respective pairs of side supports -24a- the upper parts of which are attached to one another by means of a bridge formed by a rear crosspiece -24b-, a front crosspiece -24c- and two inner side members -24d-. The rear and front crosspieces -24b, 24c- are provided with respective passages that are longitudinally aligned with one another. Respective annular bearings -30- aligned with said passages are mounted in the front part of the front crosspiece -24c- and in the rear part of the rear crosspiece -24b-. On the other hand, one of the guiding elements -17- is mounted between the rear and front crosspieces -24b, 24c-. The push bar -15- extends through the passages, the annular bearings -30- and the inner cavity of the guiding element -17-. The upper ends of each pair of side supports -24a- are attached by a junction plate -24k- having a base plate -24l- integral with a supporting side plate -24e- mounted therein.

Each of the supporting side plates -24e- has in the inner face thereof a longitudinal guidance passage defined between pairs of inner wheels -24f- mounted in respective rotating shafts -24g-. The lower ends of each of the pairs of side supports -24a- are attached to one another by means of a lower longitudinal plate -24h- which is in turn coupled to two lower supporting plates -24i- resting on the ground by means of a plurality of leveling elements -24j-.

Each of the supporting side plates -24e- comprises a window -24m- extending from the upper edge of the supporting side plate -24e- to the base plate -24l-. A roller support -26a- in which there is mounted a horizontal roller -26- with the capacity to rotate about a vertical axis of rotation (not shown in the drawings) is located in window -24m-. The roller support -26a- and the horizontal roller -24- are protected by a protective member -29- arranged in the upper part of the window -26-

The push carriage -25- comprises two longitudinal side arms -25a- the end parts of which are attached to one another by a front crosspiece -25d- and a rear crosspiece -25e-, respectively, which are located in a plane below the horizontal plane in which the side arms -25a- extend. There is envisaged in the rear part of the front crosspiece -25d- a transverse slot -25f- which is also arranged below the horizontal plane of the side arms -25a-. The transverse slot -25f- is provided with a coupling passage -25g- for the coupling of the push bar -15-.

At the front end of each side arm -25a- there is mounted a supporting roller -31- for the coupling of connecting arms -32- which serves to connect the outlet area -1b- of the block conveyor -1- with the synchronized belt conveyor -3-. Each of the side arms -25a- furthermore has an outer guiding rib -25b- extending from its rear end to its front end. The push carriage -25- moves in the longitudinal guidance passage defined between the inner wheels -24f- of the supporting structure -24- guided by the outer guiding ribs -25b-. The horizontal rollers -26- are supported on the outer surface of the respective outer guiding rib -25b-, thus providing lateral guidance of the push carriage -25-.

The push carriage -25- comprises two lug elements -25c- comprising respective upper parts and respective lower parts.

The lower part of each thick side plate -25c- is integral with one of the side arms -25a-, whereas the upper part of each lug element -25c- is articulated by a front articulation -27a- to a first end of a connecting rod -27- for pulling on the clamp. The second end of the connecting rod -27- is in turn externally articulated to one of the delivery clamps -8a, 9a- by means of a rear articulation. On the other hand, the lower part of each lug element -25c- is integral with one of the side arms -25a-.

In an alternative embodiment, the push carriage -25- comprises two thick side plates -14a- comprising respective upper parts and respective lower parts. The lower part of each thick side plate -14a- is connected with a lateral end of the transverse pusher rod -26f- by means of a lower connecting rod -27- articulated by one of its ends to said lower part and articulated by the other end to the transverse pusher rod -26f-. A rear vertical transverse plate -26d- receives the free end of the push bar -15- and a transverse pusher rod -26f-.

Figure 17:
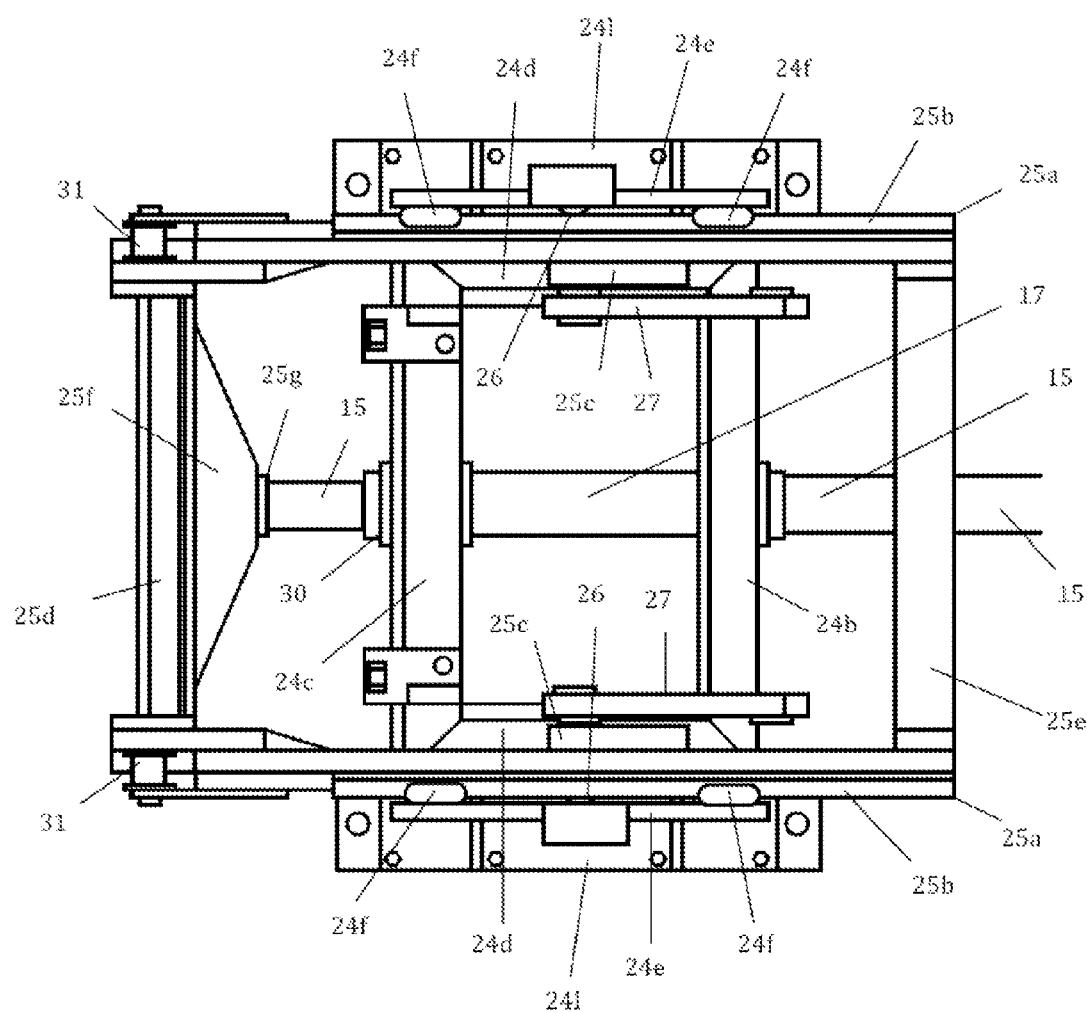
FIG. 17 is a top plan view of the assembly shown in FIG. 15.
Figure 18:
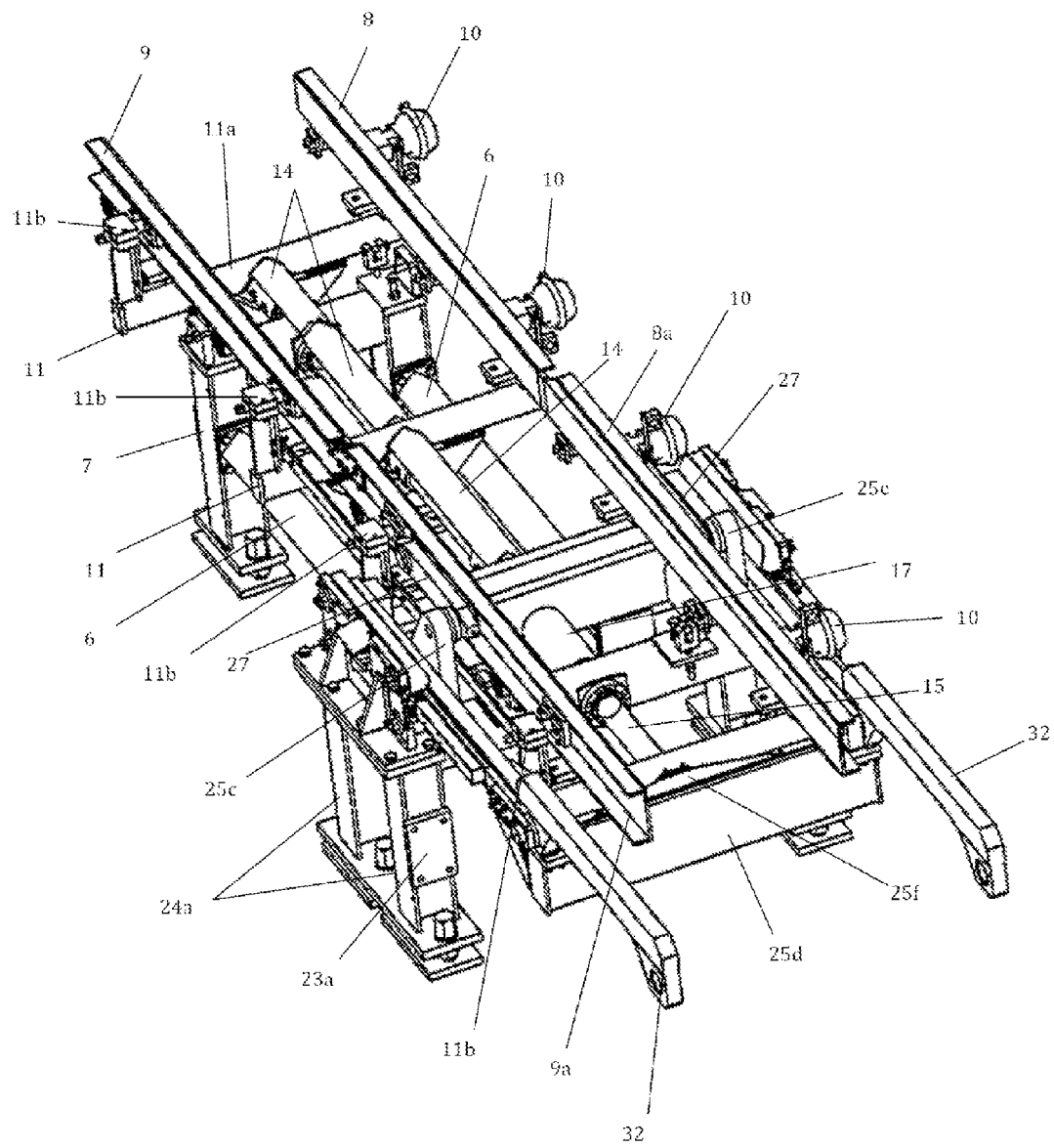
FIG. 18 is a front top perspective view of the outlet area of the mold conveyor for conveying molds to the synchronized belt conveyor, according to FIG. 1.
Figure 19:
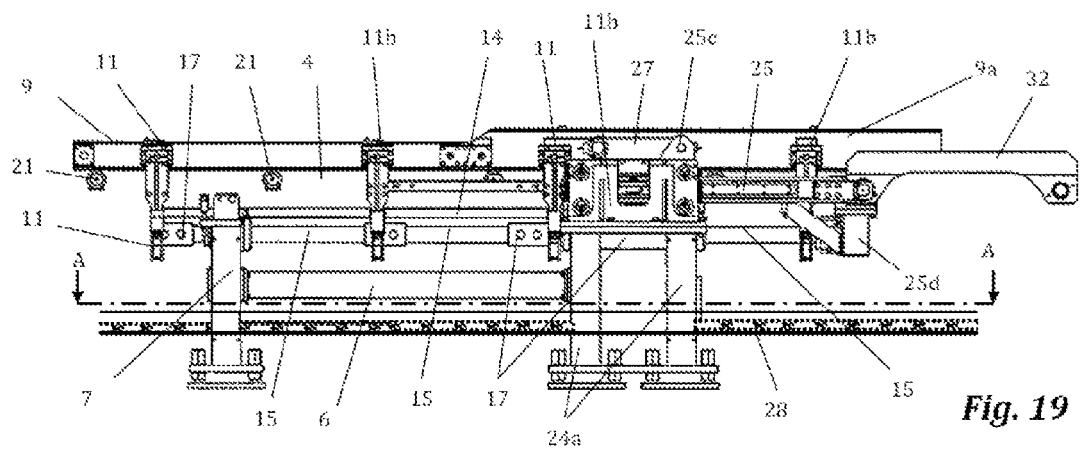
FIG. 19 is a side elevational view of the outlet area of the mold conveyor for conveying molds to the synchronized belt conveyor, according to FIG. 1.
Figure 20:
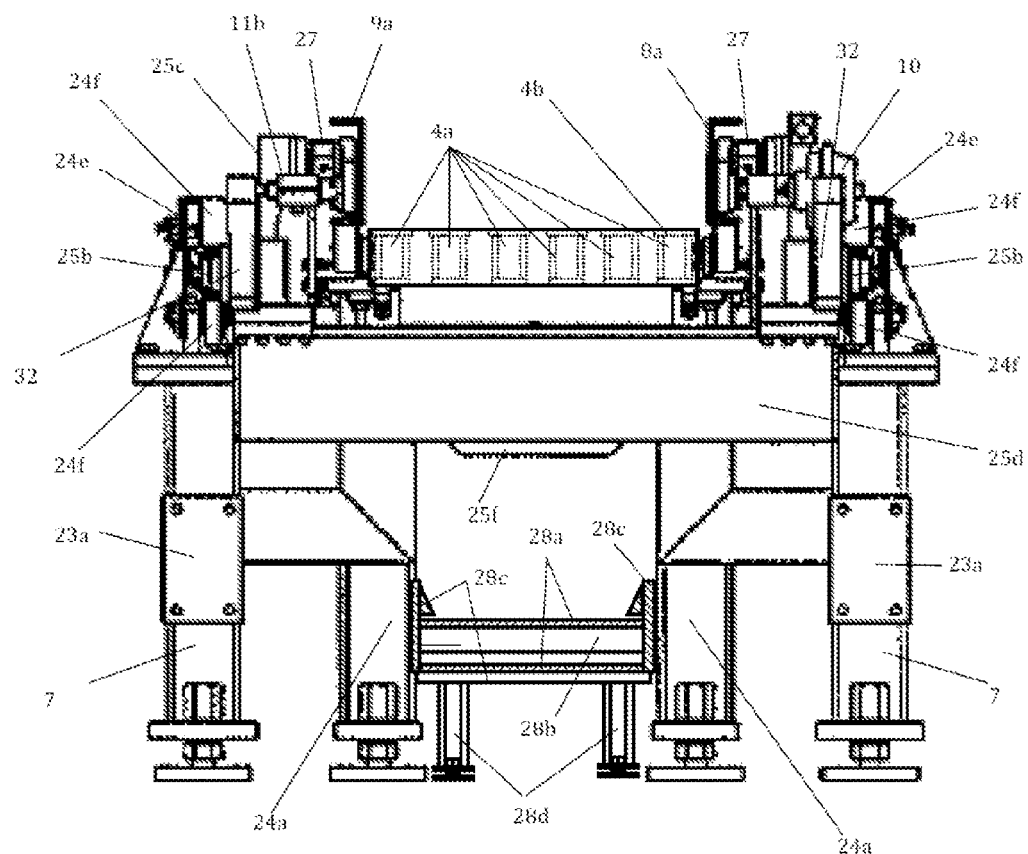
FIG. 20 is a front elevational view of the outlet area shown in FIG. 18.
Figure 21:
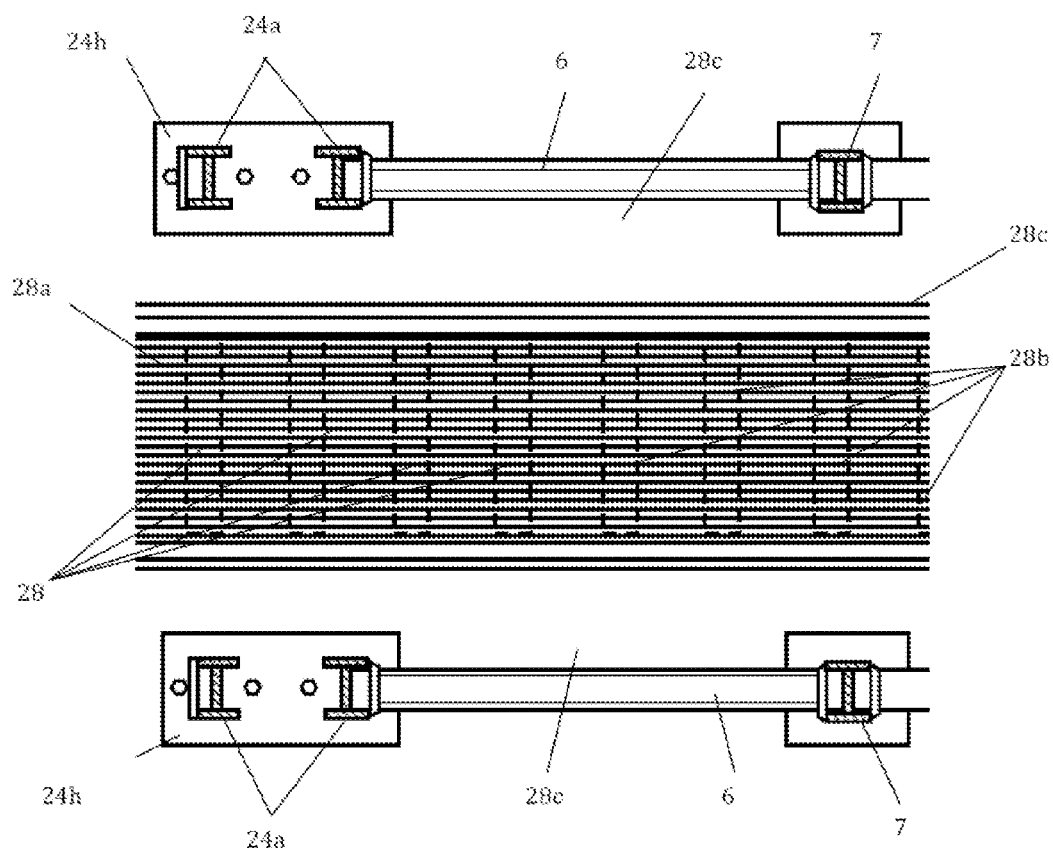
FIG. 21 is a sectional view along line A-A shown in FIG. 19.
Figure 22:
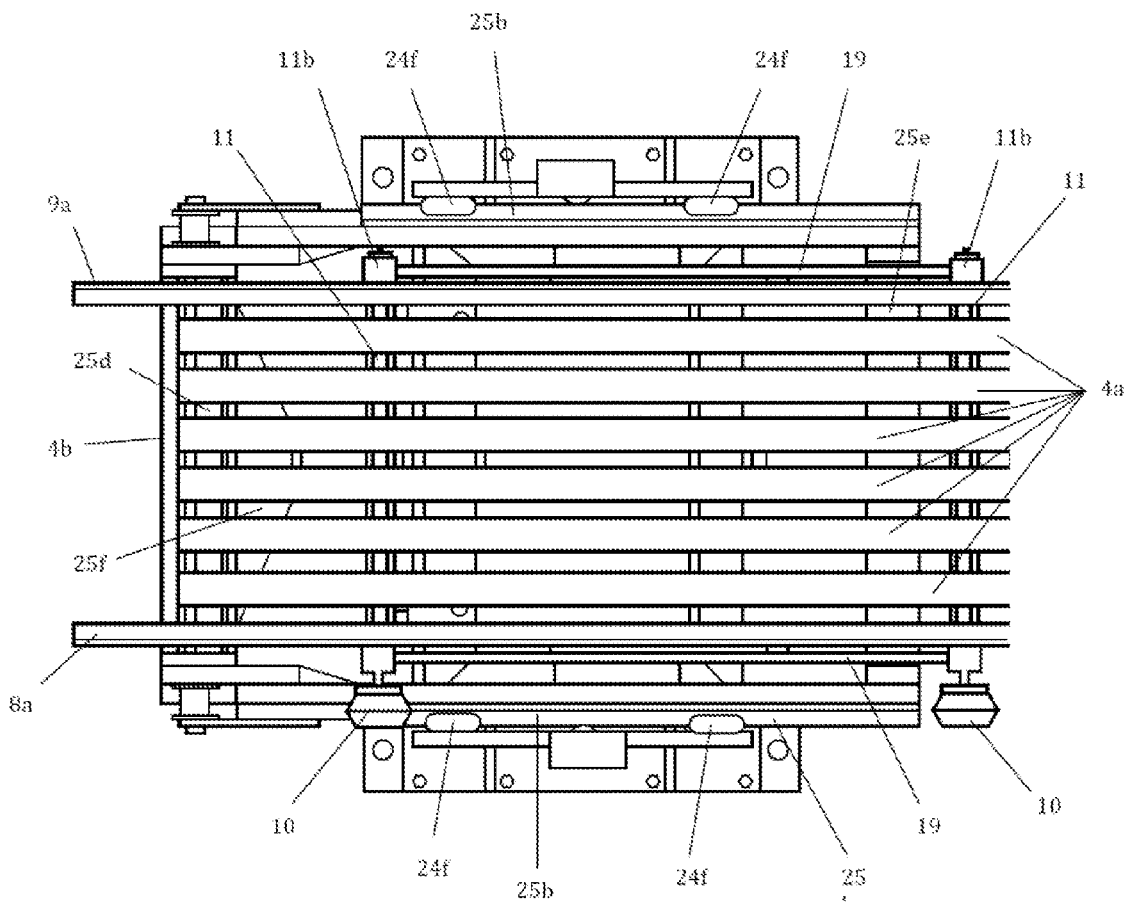
FIG. 22 is a partial top plan view of the outlet area of the mold conveyor shown in FIG. 18.
Figure 23:
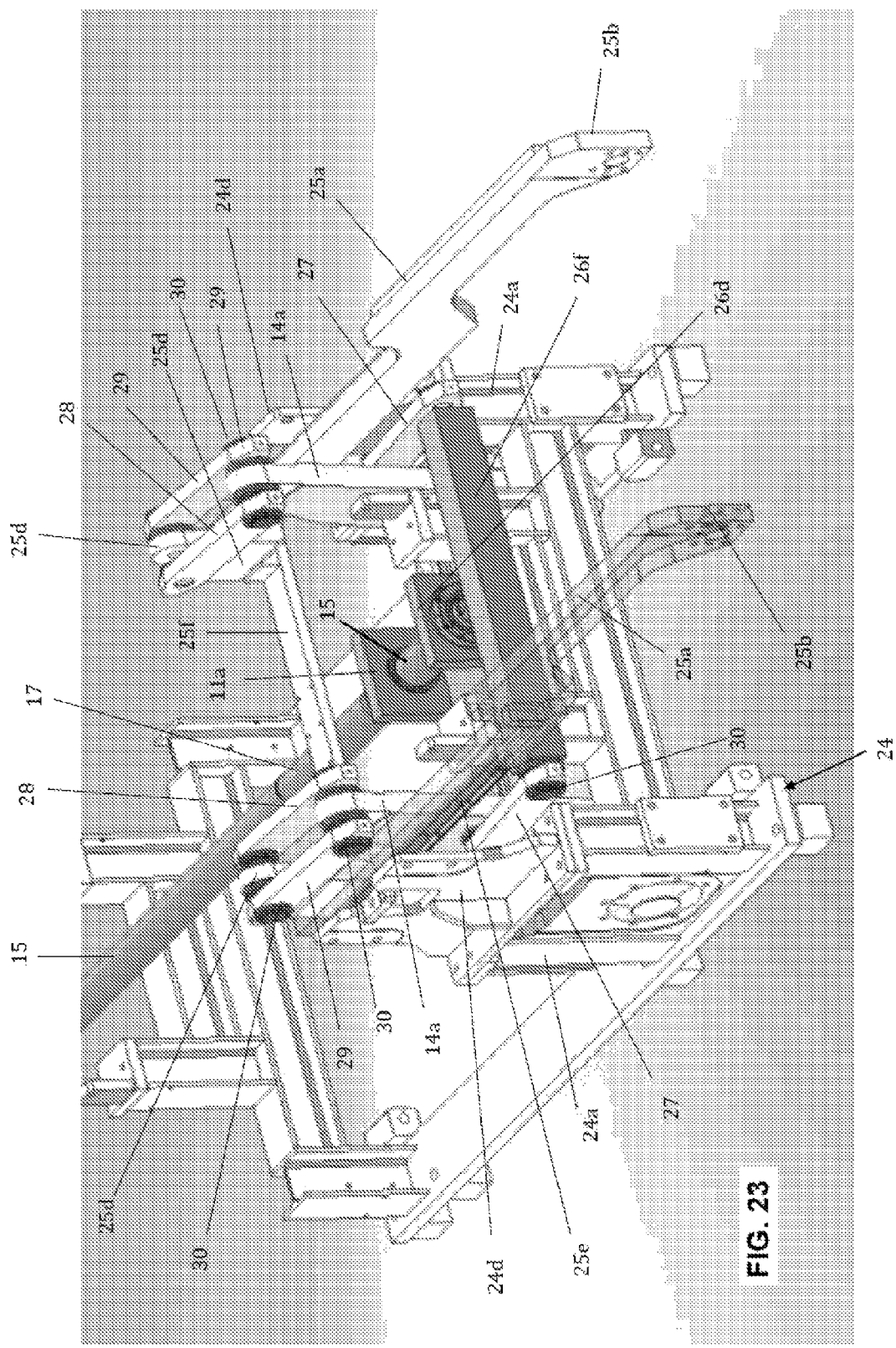
FIG. 23 is a top perspective view of the push carriage and of the delivery mechanism which are located in the outlet area of the mold conveyor according to an alternative embodiment.

In turn, the upper part of each thick side plate -14a- is articulated to a first end of an inner upper connecting rod -28- the opposite end of which is in turn externally articulated to one of the clamps -8, 9-. On the other hand, the upper part of each thick side plate -14a- is articulated to one of the lug elements -25d- by means of an outer upper connecting rod -29- (FIG. 17). The corresponding articulations comprise respective pins -30- forming transverse rotating shafts.

The invention claimed is:

1. Mold conveyor comprising a mold inlet area and a mold outlet area, comprising
    a frame having mounted therein a supporting grille for supporting a plurality of molds in positions that are moved forward successively,
    a clamping mechanism which can move longitudinally with respect to the supporting grille and which comprises respective longitudinal clamps arranged on opposite sides along the supporting grille, at least one of the clamps being transversely movable by a plurality of actuators between a clamping position in which the clamps can hold the blocks against one another and a release position in which the clamps do not hold the molds,
    a reciprocating mechanism for moving the clamping mechanism forward when the clamps are in their clamping position and for moving the clamping mechanisms backward when the clamps are in their release position, wherein
    the clamps comprise a pair of delivery clamps arranged in the outlet area of the mold conveyor;
    the reciprocating mechanism comprises a push device arranged in the outlet area of the mold conveyor, the push device comprising respective lug elements articulated to the delivery clamps by means of respective connecting rods for pulling on the clamp and the push device being connected to actuation means providing reciprocating movement to the push device;
    the push device is a push carriage connected to the actuation means by means of a linear push system comprising at least one linear push element comprising a driving element connected to the actuation means and arranged in an area upstream of the inlet area of the mold conveyor, and a longitudinal push bar connecting the driving element to the push carriage and extending linearly below the supporting grille;
    the push carriage is guided horizontally in a supporting structure to perform a horizontal forward and backward movement.

2. Mold conveyor according to claim 1, wherein the actuation means are located in a molding machine.

3. Mold conveyor according to claim 1, wherein the actuation means comprise an electric motor and a longitudinal spindle.

4. Mold conveyor according to claim 1, wherein the linear push system comprises a single linear push element acting on a transverse part of the push carriage.

5. Mold conveyor according to claim 1, wherein a transverse part of the push carriage is a front crosspiece provided with a rear transverse slot in which the push bar is coupled.

6. Mold conveyor according to claim 1, wherein
    the push carriage comprises respective side arms attached by at least one rear crosspiece and one front crosspiece located below the supporting grille;
    each of the side arms has a longitudinal outer guiding rib guided in a longitudinal guidance passage located in the supporting structure.

7. Mold conveyor according to claim 6, wherein the supporting structure comprises respective upper supporting side plates mounted in respective pairs of side supports, and in that in each side plate there are mounted upper and lower wheels which together define the longitudinal guidance passage in which the respective outer guiding rib of the push carriage is guided.

8. Mold conveyor according to claim 7, wherein each supporting side plate has a window in which there is mounted a horizontal roller with the capacity to rotate about a vertical axis of rotation contacting an outer surface of the respective outer guiding rib, thus providing lateral guidance of the push carriage.

9. Mold conveyor according to claim 7, wherein the pairs of side supports are attached to one another by a bridge on which the supporting grille is supported.

10. Mold conveyor according to claim 9, wherein the bridge comprises a rear crosspiece, a front crosspiece, and an inner side member, and in that the push bar extends through the rear crosspiece and the front crosspiece.

11. Mold conveyor according to claim 1, wherein a longitudinal spindle driven by an electric motor can be mounted in a structure of a molding machine delivering the molds to the mold conveyor.

12. Mold conveyor according to claim 1, wherein the push bar is guided longitudinally in guiding elements mounted in the frame.

13. Mold conveyor according to claim 12, wherein at least some of the guiding elements are hollow bodies with respective axial cavities through which the push bar passes.

14. Mold conveyor according to claim 1, wherein a longitudinal spindle driven by an electric motor is connected to the push bar.

15. Mold conveyor according to claim 1 further including a conveyor device comprising a waste conveyor belt driven by an electric motor and arranged below the supporting grille.

16. Mold conveyor according to claim 15, wherein the waste conveyor belt is arranged at least below the push carriage and along an entire cooling conveyor belt.

17. Mold conveyor according to claim 1, wherein the push carriage comprises respective thick side plates connected to the clamps.

18. Mold conveyor according to claim 17, wherein
    the thick side plates of the push carriage are attached to one another by a crosspiece connected to each linear push element and comprise respective upper parts;
    each upper part is connected to one of the clamps through an inner upper connecting rod;

the inner upper connecting rod comprises a first end part articulated to said upper part and a second end part articulated to the clamp.

* * * * *